(12) United States Patent
Haumann et al.

(10) Patent No.: US 9,815,354 B2
(45) Date of Patent: Nov. 14, 2017

(54) ROLLO ASSEMBLY AND OPEN ROOF CONSTRUCTION FOR A VEHICLE PROVIDED THEREWITH

(71) Applicant: Inalfa Roof Systems Group B.V., Oostrum (NL)

(72) Inventors: Gerardus Franciscus Jacobus Haumann, Venray (NL); Suyanto Teri Wahiyu Ten-Jet-Foei, Helmond (NL); Eduardus Christianus Henricus Van Boxtel, Reek (NL); Mathijs Maessen, Helden (NL)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 0 days.

(21) Appl. No.: 15/184,623

(22) Filed: Jun. 16, 2016

(65) Prior Publication Data

US 2017/0028826 A1    Feb. 2, 2017

(30) Foreign Application Priority Data

Jul. 28, 2015   (EP) .................................... 15178560

(51) Int. Cl.
  *B60J 3/02*   (2006.01)
  *B60J 7/00*   (2006.01)
  (Continued)

(52) U.S. Cl.
  CPC ............ *B60J 7/0015* (2013.01); *B60J 7/0023* (2013.01); *B60Q 3/208* (2017.02); *B60Q 3/78* (2017.02)

(58) Field of Classification Search
  CPC . B60J 7/0015; B60Q 3/62; B60Q 3/78; B60Q 3/028
  (Continued)

(56) References Cited

U.S. PATENT DOCUMENTS 6,517,226 B1 * 2/2003 Zimmermann ......... G09F 13/22
                                                      313/512
8,419,119 B2 * 4/2013 Nakamura ............. B60J 7/0015
                                                      160/265
(Continued)

FOREIGN PATENT DOCUMENTS

DE        19936537 A1    2/2001
DE     102009033885 A1    1/2011
(Continued)

OTHER PUBLICATIONS

European Search Report and Written Opinion for related European patent application No. 15173560.7, dated Jan. 15, 2016.

*Primary Examiner* — Dennis H Pedder
(74) *Attorney, Agent, or Firm* — Steven M. Koehler; Westman, Champlin & Koehler, P.A.

(57) ABSTRACT

A rollo assembly for use in a vehicle comprises a rollo screen having opposite forward and rearward sides and two opposite lateral sides, a winding tube for the rollo screen at the rearward side, an operating beam connected to the forward side and having two outer ends, and two longitudinally extending guides for guiding respective ones of the outer ends of the operating beam and respective ones of the lateral sides of the rollo screen. Said lateral sides are provided with retention members cooperating with corresponding parts of the guides for retaining said lateral sides in said guides. The rollo screen is provided with light transmitting and emitting members which have an end portion extending at least up to a first one of the lateral sides of the rollo screen. At least one elongate light bar extends longitudinally along said guide to transmit light into said end portion.

17 Claims, 7 Drawing Sheets

(51) Int. Cl.
*B60Q 3/208* (2017.01)
*B60Q 3/78* (2017.01)

(58) Field of Classification Search
USPC .......................... 296/214; 362/490, 493, 511
See application file for complete search history.

(56) References Cited

U.S. PATENT DOCUMENTS

| | | | |
|---|---|---|---|
| 2004/0109313 A1* | 6/2004 | Smith | B60Q 1/2611 |
| | | | 362/240 |
| 2006/0067084 A1* | 3/2006 | Stefanov | F21S 48/2237 |
| | | | 362/511 |
| 2008/0190571 A1 | 8/2008 | Wimmer | |
| 2015/0175064 A1 | 6/2015 | Albert | |
| 2017/0010404 A1* | 1/2017 | Chen | G02B 6/0061 |

FOREIGN PATENT DOCUMENTS

| | | | |
|---|---|---|---|
| DE | 102013104341 A1 | | 10/2014 |
| DE | 102013011605 A1 | | 1/2015 |
| FR | 2991931 A1 | | 12/2013 |
| KR | 1020100020318 | * | 2/2010 |
| WO | 2006105768 A1 | | 10/2006 |

* cited by examiner

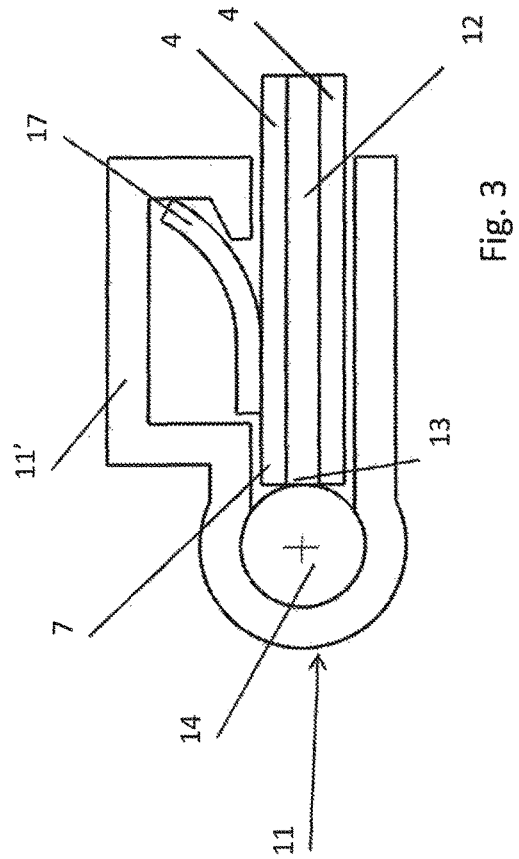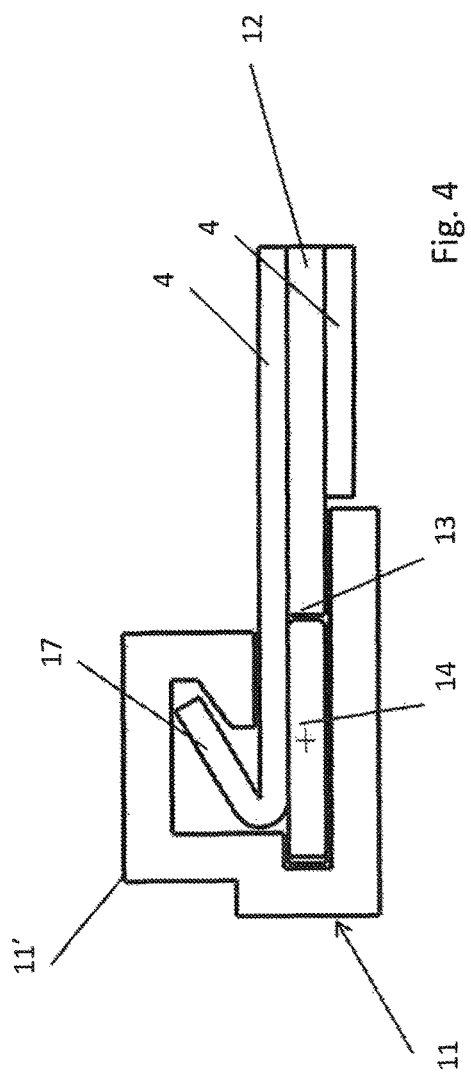

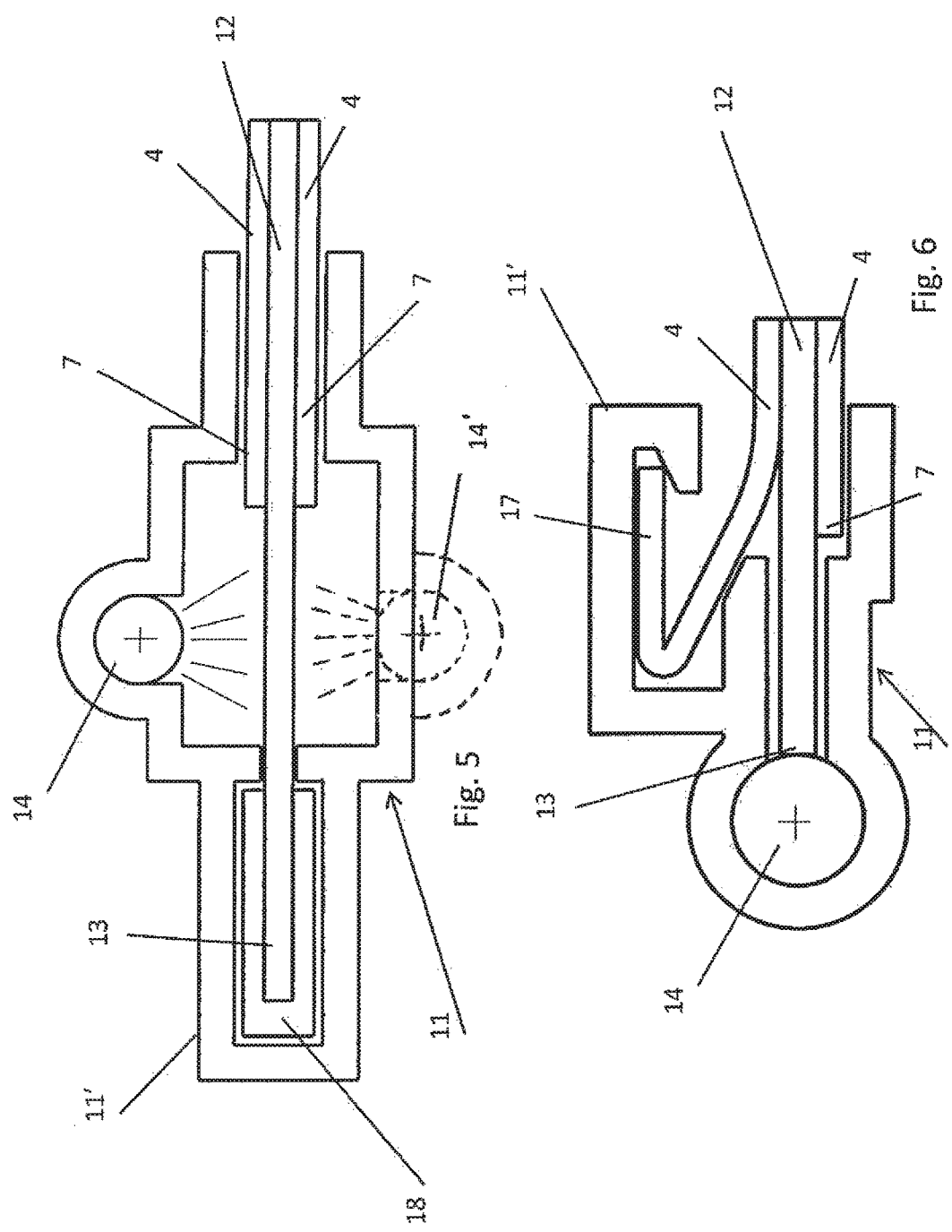

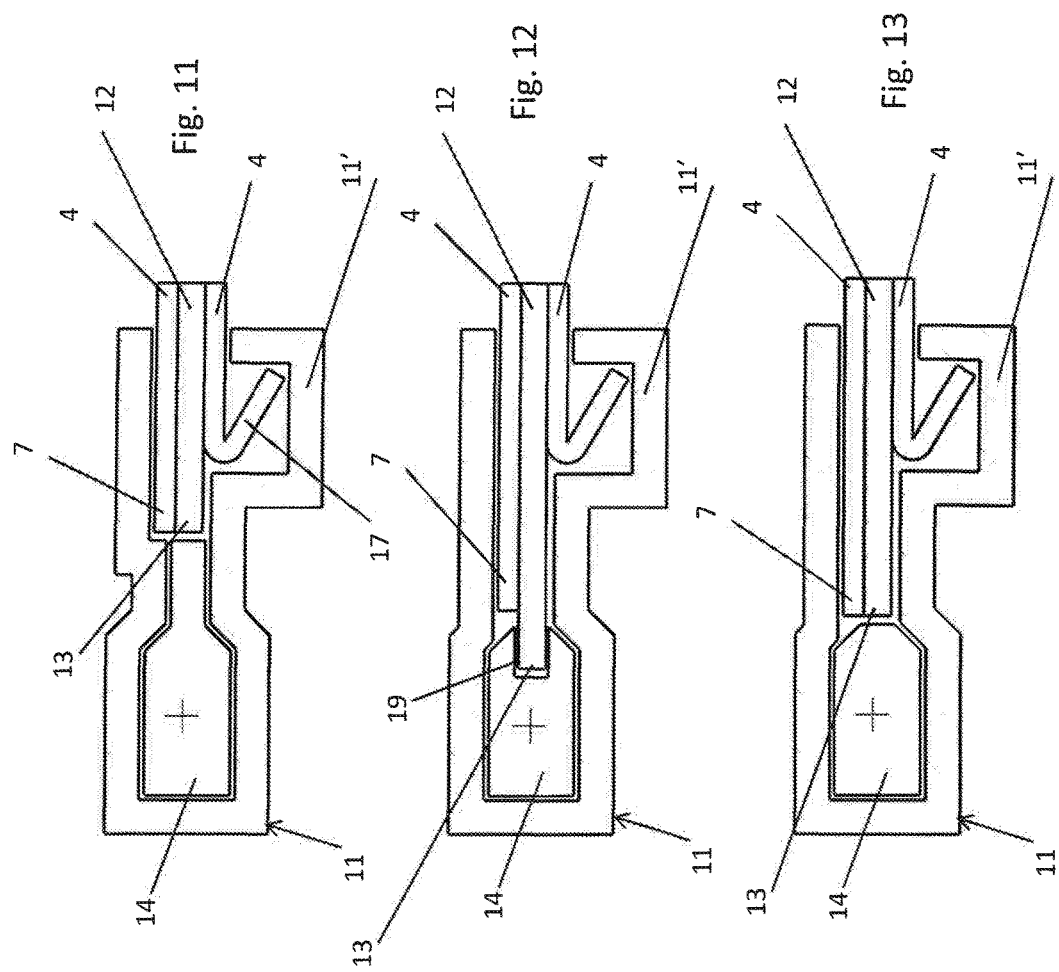

ROLLO ASSEMBLY AND OPEN ROOF CONSTRUCTION FOR A VEHICLE PROVIDED THEREWITH

BACKGROUND

The discussion below is merely provided for general background information and is not intended to be used as an aid in determining the scope of the claimed subject matter.

In a first aspect the invention relates to a rollo assembly intended for use in an open roof construction for a vehicle, comprising a rollo screen having opposite forward and rearward sides and two opposite lateral sides, a winding tube for winding and unwinding the rollo screen at the rearward side, an operating beam connected to the forward side and having two outer ends, and two longitudinally extending guides for guiding respective ones of the outer ends of the operating beam and respective ones of the lateral sides of the rollo screen, wherein said lateral sides are provided with retention members cooperating with corresponding parts of the guides for retaining said lateral sides in said guides.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they in-tended to be used as an aid in determining the scope of the claimed subject matter. The claimed subject matter is not limited to implementations that solve any or all disadvantages noted in the Background.

A rollo assembly is provided with light transmitting and emitting members which have an end portion extending at least up to a first one of lateral sides of the rollo screen and wherein at least a guide intended for guiding said first one of the lateral sides is provided with at least one elongate light bar extending longitudinally along said guide in such a position that it can transmit light into said end portion of the light transmitting and emitting members.

The use of a stationary elongate light bar allows to transmit light into the end portions of the light transmitting and emitting members and this light then is evenly distributed and emitted over the entire rollo screen (that is to say, everywhere over the rollo screen where the light transmitting and emitting members are provided). This effect is maintained, irrespective whether the rollo screen is moving or has assumed a stationary position. There is no need for complicated optical or electrical connections (the latter in the case that a light source would be integrated into the rollo screen) nor for expensive switch-arrangements. Because there is no physical contact between the light bar and the light transmitting and emitting members, the rollo assembly experiences little wear and thus has a very long life span and frictional forces during moving the rollo screen are minimised (thus less force is required for moving the rollo screen). In accordance with an aspect of the present invention such a light bar without any problem can be combined with the retention members which assure that the lateral sides of the rollo screen cannot come out of the guides. As a result a reliable rollo assembly for a vehicle is achieved with attractive lighting properties.

When the rollo screen is in a fully deployed position (a position in which it is unwound from the winding tube to a maximum extent), the entire amount of rollo screen wound off (that is to say, everywhere over the rollo screen where the light transmitting and emitting members are provided) is lightened. This applies too in a partly deployed position. In such a partly deployed position, however, the lighting bar also emits light at places where the rollo screen is not present, causing an attractive type of ambient lighting.

In an embodiment of the rollo assembly said end portion of the light transmitting and emitting members substantially ends at the respective lateral side of the rollo screen. This means that the respective members have an outer end substantially coinciding with said lateral side.

Then it is conceivable that the elongate light bar is located laterally with respect to the respective lateral side of the rollo screen (thus that light emitted by the light bar will enter a frontal end of the light transmitting and emitting members). This allows to keep the dimensions of the rollo assembly, especially perpendicularly to the rollo screen (the so-called packaging height), as small as possible.

In another type of embodiment said end portion of the light transmitting and emitting members protrudes laterally beyond the respective lateral side of the rollo screen. This means that the respective members do not end at the lateral side, but extend a little but further out of (beyond) the rollo screen's lateral side.

In such an embodiment it is possible that the elongate light bar is located above or below said protruding end portion. In such an embodiment the light emitted by the light bar enters the light transmitting and emitting members from a side of the latter and not at a frontal end of latter.

Such an embodiment also offers the opportunity to provide said protruding end portion at its outer end with a retention member (for example comprising strips attached to an upper and lower surface of the protruding end and received in corresponding parts of the guide).

However, as an alternative the elongate light bar is located laterally with respect to the respective protruding end portion.

In a specific embodiment the elongate light bar is provided with a recess extending longitudinally and intended for at least partially receiving said protruding end portion. This may increase the efficiency of transmission of light from the light bar into said light transmitting and emitting members.

For further improving such efficiency said recess may be provided with chamfered walls.

In yet another embodiment the elongate light bar comprises two opposite frontal ends, wherein a light source is positioned at at least one of said frontal ends. The light source may be of any appropriate type to effectively transmit light into the light bar (for example a LED). It is conceivable that at both frontal ends of the light bar such a light source is provided.

In one embodiment of the rollo assembly according to an aspect of the present invention both guides are provided with a light bar for cooperation with respective end portions of light transmitting and emitting members in the vicinity of both lateral sides of the rollo screen. This means that at both sides of the rollo screen light bars are provided for transmitting light into such members. Said members also may have two end portions at opposite lateral sides and thus cooperating with two light bars, but it too is possible that each light transmitting and emitting member only has one end portion cooperating with a single light bar and that end portions of a first group of members cooperate with one light bar only and end portions of another group of members cooperate with the other light bar only. Combinations of such embodiments are conceivable too.

In another embodiment the retention members comprise hook-like retention members cooperating with respective parts of the guides and provided at at least one of the upper and lower surfaces of the rollo screen. There may be provided more than one of such hook-like retention members at a lateral side (for example one on the upper surface and one on the lower surface of the rollo screen). The hook-like retention members (which may extend continuously or intermittently in a longitudinal direction) may be separate parts attached to the rollo screen, but also may comprise inwardly folded edge parts of the rollo screen. Such hook-like retention members improve the retention of the lateral side of the rollo screen in the guide (and prevent that the lateral side is pulled out of the guide).

In one embodiment the light bars comprise injection moulded parts (integrated into the guides and for example made of glass fiber) with a cross sectional area between 4 and 40 $mm^2$, and preferably between 4 and 10 $mm^2$, per each meter of length of a said light bar.

In another embodiment the light bars have an outer surface which at least partially, preferably opposite said end portion, is provided with means for improving the transmission of light into said end portion, such as a light reflecting layer, a roughening or, preferably triangular, protruding parts, such that the efficiency of the light bars in terms of light transmission only into the end portions of the light transmitting and emitting members is further improved.

In one embodiment the light bars have a cross section which in a direction towards the end portion tapers to a reduced thickness, preferably substantially to the thickness of the end portion. Such a taper may have different shapes and further improves the efficiency of the light transmission towards the end portion.

In one embodiment the light transmitting and emitting members are positioned at the side of the rollo screen facing an interior of the vehicle. However, a position on top of the rollo screen (or both) is possible too, as well as a position sandwiched between two rollo screen layers (of which, then, the lower at least partially should be transparent for the light emitted).

In another embodiment the light transmitting and emitting members comprise glass fibers oriented transversally and preferably woven into the rollo screen. However, other orientations of such glass fibers may be used too, if necessary. The thickness of said glass fibers may lie in a range from 0.1 to 1 mm (enabling the rollo screen to be wound onto the winding tube), and preferably in a range from 0.25 to 0.5 mm.

In a special embodiment of the rollo assembly the light transmitting and emitting members are combined into a single flexible foil), which preferably is adhered to the side of the rollo screen facing an interior of the vehicle. This means that there are no separate members, but a single foil (capable of transmitting and emitting light) extending over the respective part of (in most cases all of) the rollo screen, of which foil at least one lateral edge portion cooperates with a light bar.

It also is possible that the foil is sandwiched between two layers of the rollo screen.

In a second aspect the invention relates to an open roof construction for a vehicle, comprising a roof opening in a stationary roof part, a movable panel which can move relative to said roof opening and a rollo assembly according to the present invention of which the rollo screen is movable between a position for freeing said roof opening and a position for closing said roof opening.

BRIEF DESCRIPTION OF THE DRAWINGS

Hereinafter aspects of the invention will be elucidated while referring to the drawings, in which:

FIGS. 3-13 show different embodiments of the rollo assembly in a partial cross section according to A-A in FIG. 2.

DETAILED DESCRIPTION OF THE ILLUSTRATIVE EMBODIMENT

Figure 1:
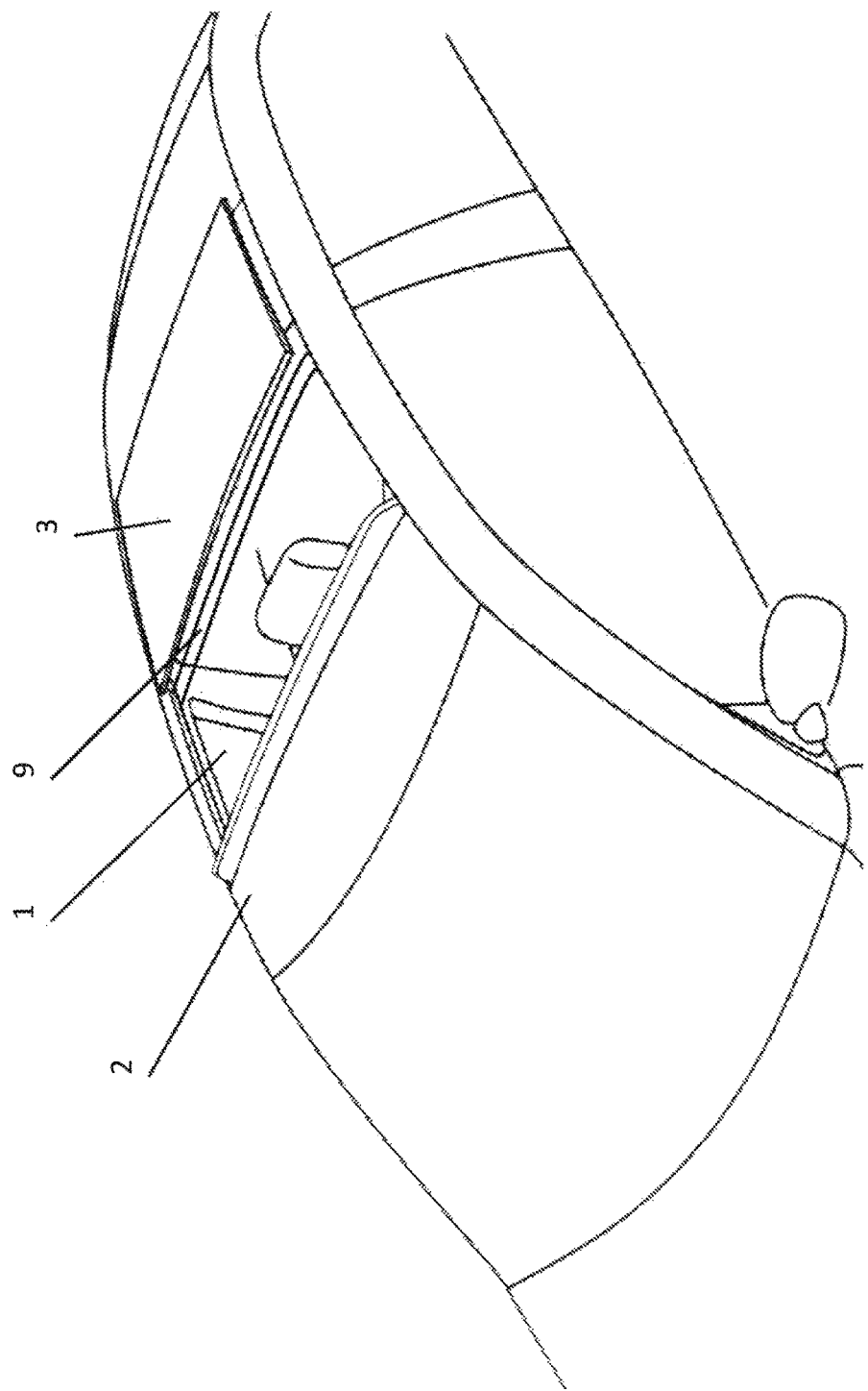
FIG. 1 schematically illustrates part of a vehicle with an open roof construction provided with a rollo assembly.

Firstly referring to FIG. 2 one half of an open roof construction is illustrated which, as shown in FIG. 1, generally comprises a roof opening 1 in a stationary roof part 2, a movable panel 3 which can move relative to said roof opening 1 (by means known per se and not shown here) and a rollo assembly to be elucidated below (of which in FIG. 1 only an operating beam 9 is visible).

The rollo assembly comprises a rollo screen 4 (made for example of a cloth material) which is movable between a position for freeing said roof opening 1 and a position for closing (or obscuring), at least partly, said roof opening. The rollo screen 4 has a forward side 5, an opposite rearward side 6 and two opposite lateral sides 7 (of which obviously only one has been shown). A winding tube 8 is provided for winding and unwinding the rollo screen 4 at the rearward side 6. An operating beam 9 is connected to the forward side 5 and has two outer ends 10 (of which obviously only one has been shown). Further two longitudinally extending guides 11 (of which obviously only one has been shown) are illustrated for guiding respective ones of the outer ends 10 of the operating beam 9 and respective ones of the lateral sides 7 of the rollo screen 4.

As will appear later (for example in relation to FIGS. 3, 4 and 6-8) the lateral sides 7 of the rollo screen 4 are provided with retention members cooperating with corresponding parts of the guides 11 for retaining said lateral sides 7 in said guides 11.

The rollo screen 4 is provided with light transmitting and emitting members 12 which have a lateral end portion 13 extending at least up to a first one of the lateral sides 7 of the rollo screen 4. These members 12 may be provided in the rollo screen 4 in any desired pattern and it is conceivable that the entire rollo screen 4 or only some parts thereof are provided with such members 12.

At least the guide 11 intended for guiding said first one of the lateral sides 7 of the rollo screen 4 is provided with at least one elongate light bar 14 extending longitudinally along said guide 11 in such a position that it can transmit light into said end portion 13 of the light transmitting and emitting members 12.

Figure 2:
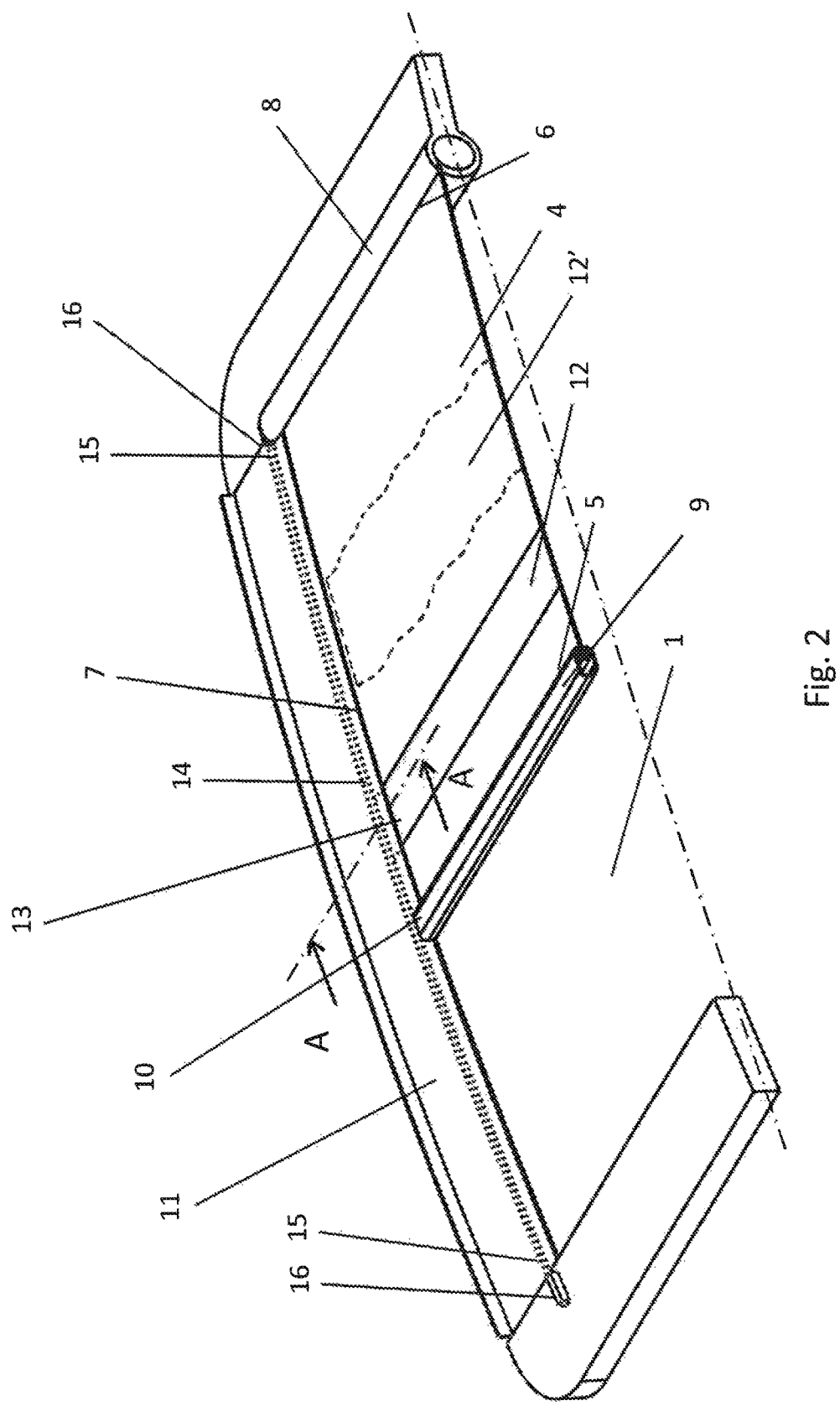
FIG. 2 schematically and in a perspective view illustrates one half of an open roof construction provided with a rollo assembly.

In the illustrated embodiment of FIG. 2 the elongate light bar 14 comprises two opposite frontal ends 15 and a light source 16 (for example an LED) is positioned at each of said ends 15. The light emitted by the light sources 16 enters the light bar 14 at said frontal ends 15 and is emitted by the light bar 14 over its entire length and will enter the end portions 13 of the members 12 which will transmit (distribute) and emit the light over the rollo screen 4 in accordance with their pattern over the rollo screen.

The light bars 14 preferably are provided with features for improving the transmission of light into said end portions 13 only, as will appear later.

Preferably both guides 11 (thus also the one not illustrated) are provided with a light bar 14 for cooperation with respective end portions 13 of light transmitting and emitting members 12 in the vicinity of both lateral sides 7 of the rollo screen 4.

The light bars 14 may comprise injection molded parts with a cross sectional area between 4 and 40 mm$^2$, and preferably between 4 and 10 mm$^2$, per each meter of length of a said light bar.

The cross section of the light bars 14 may have any desired shape, such as circular, square, rectangular, oval or even other, more irregular, shapes, as will appear later.

Next reference is made to FIGS. 3-13 which, schematically and in part, illustrate cross sections (as viewed in a longitudinal direction according to A-A in FIG. 2) of different embodiments in a region of a guide 11.

FIG. 3 shows an embodiment of a rollo assembly in which the end portion 13 of the light transmitting and emitting members 12 substantially ends at the respective lateral side 7 of the rollo screen 4. The elongate light bar 14 is located laterally with respect to the respective lateral side 7 of the rollo screen 4 and is housed in a correspondingly shaped part of the guide 11.

FIG. 3 further shows a hook-like retention member 17 cooperating with a respective part 11' of the guide 11. In this embodiment the retention member 17 is provided on the upper surface of the rollo screen 4, but in other embodiments it may be located on the lower surface (e.g. FIG. 7) or on both (e.g. FIG. 8). The retention member 17 may be a separate part attached to the rollo screen 4 in any appropriate manner, or may be an integral part thereof formed from a single unitary body (for example a folded back part).

Due to the specific design in accordance with the present invention, the retention member 17 does not interfere with the operation of the light bar 14.

As illustrated in the embodiment of FIG. 4, the retention member 17 also may protrude transversally beyond the end portion 13 of the members 12.

The FIGS. 5-10 all illustrate embodiments in which said end portion 13 of the light transmitting and emitting members 12 protrudes laterally beyond the respective lateral side 7 of the rollo screen 4.

In FIG. 5 the elongate light bar 14 is located above said protruding end 13 (although a position below it is conceivable too, shown as light bar 14' in dashed lines if FIG. 5) Further this embodiment comprises a retention member 18 provided at an outer end of the protruding end 13 and cooperating with a corresponding part 11' of the guide.

FIG. 6 illustrates an embodiment in which the elongate light bar 14 is located laterally with respect to the respective protruding end portion 13.

Figure 7:
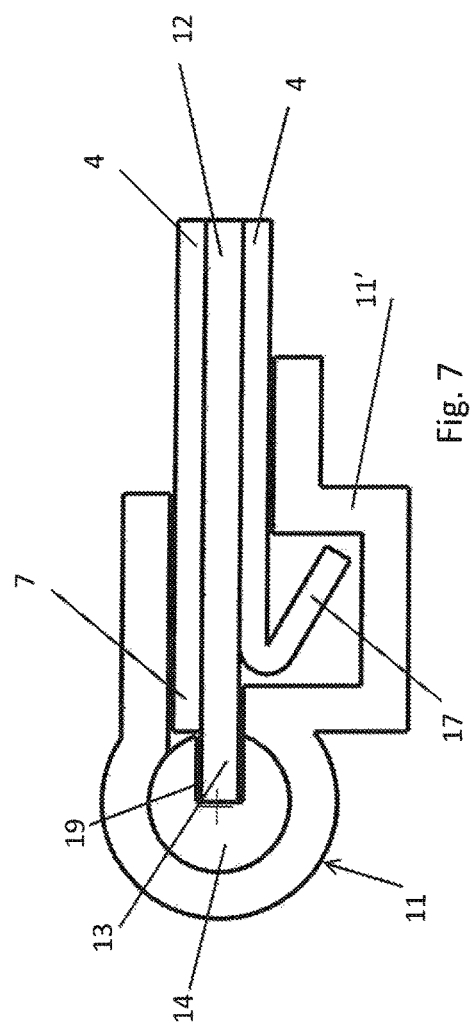
Figure 8:
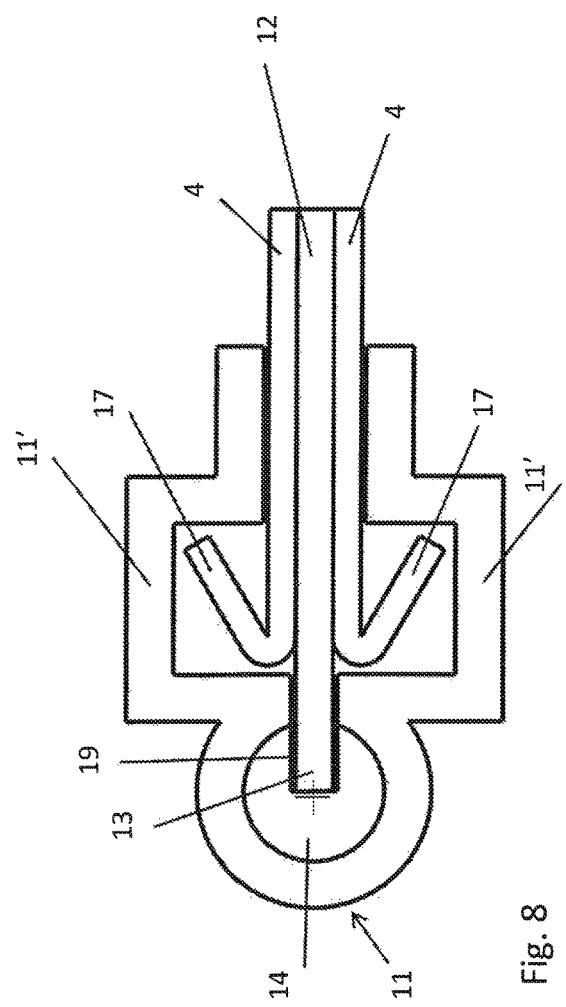

The FIGS. 7-10 relate to embodiments in which the elongate light bar 14 is provided with a recess 19 extending longitudinally and intended for at least partially receiving said protruding end portion 13. In FIG. 7 a single retention member 17 is provided on a lower surface of the rollo screen 4, whereas in FIG. 8 two retention members 17 are provided, both on the upper and lower surface of the rollo screen 4.

Figure 9:
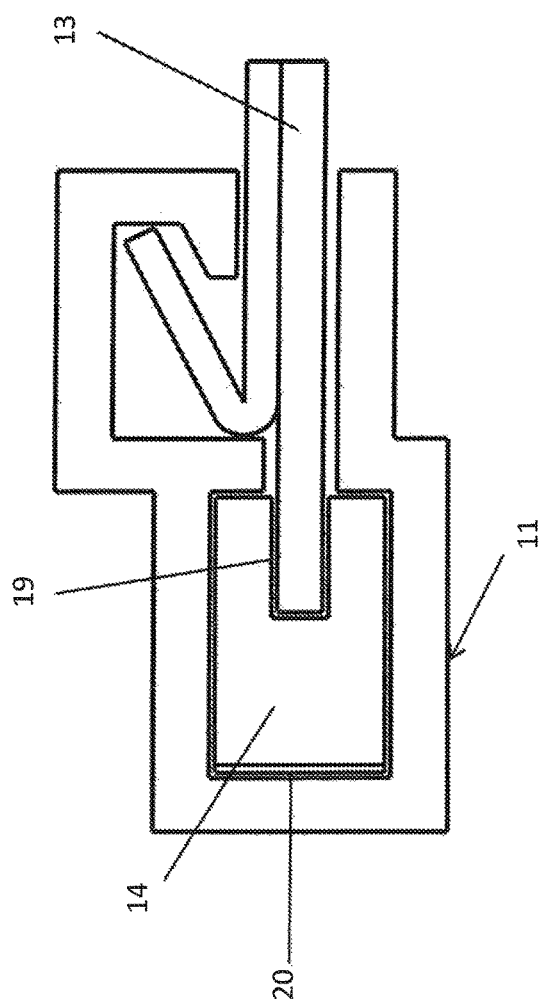
Figure 10:
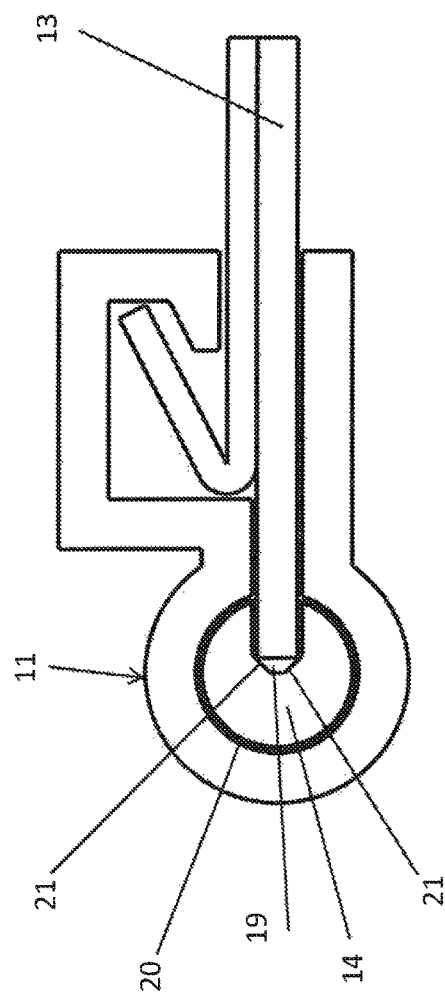

In FIGS. 9 and 10 special embodiments of the light bar 14 are shown. In FIG. 9 the light bar 14 has a square or rectangular cross section and at least a part of the outer surface of the light bar is covered with a light reflecting layer 20 (for example a white layer) for improving the efficiency of the light bar (assuring that light only is emitted towards the end portion 13).

As an alternative, layer 20 may be replaced by a roughening or protruding (preferably triangular) parts.

In the embodiment according to FIG. 10 such a reflecting layer 20 is provided on the entire outer surface of the light bar 14 (which in this embodiment has a circular cross section). Further, in this embodiment, the recess 19 is provided with chamfered walls 21 for even more increasing the efficiency of the light bar 14.

In most of the embodiments illustrated the light transmitting and emitting members 12 are illustrated as sandwiched between two layers of the rollo screen 4. However, also other embodiments are conceivable, for example wherein the members 12 are provided on top (e.g. FIG. 10 or 11) or below the rollo screen 4. As another alternative the light transmitting and emitting members 12 may comprise glass fibers oriented transversally and preferably woven into the rollo screen 4. In such an embodiment, the element indicated by reference number 12 in the figures can represent one such fiber.

In another embodiment the light transmitting and emitting members 12 may be combined into a single flexible foil (having light transmitting and emitting characteristics) which in FIG. 2 in broken lines has been indicated as foil 12'. Such a foil 12' may be adhered to one side of the rollo screen 4, preferably the lower side (facing an interior of the vehicle), but also may be sandwiched between two rollo screen layers.

Finally FIGS. 11-13 illustrate embodiments in which the light bar 14 tapers towards the end portion 13. In FIG. 11 the light bar 14 as a result has a bottle shaped cross section. In FIG. 12 the light bar tapers and has a recess 19 in its tapering part which therefore partly surrounds the end portion 13. In FIG. 13 the tapering part frontally faces the end portion 13.

Although the subject matter has been described in language specific to structural features and/or methodological acts, it is to be understood that the subject matter defined in the appended claims is not necessarily limited to the specific features or acts described above as has been held by the courts. Rather, the specific features and acts described above are disclosed as example forms of implementing the claims. For example it is possible that a guide is provided with more than one light bar, which light bars may be positioned at different positions relative to the end portion of the light transmitting and emitting members.

What is claimed is:

1. A rollo assembly configured for use in an open roof construction for a vehicle, the rollo assembly comprising:
   a rollo screen having opposite forward and rearward sides and two opposite lateral sides, wherein the rollo screen is provided with light transmitting and emitting members which have an end portion extending at least up to a first one of the lateral sides of the rollo screen, and wherein said lateral sides are provided with retention members;
   a winding tube configured to wind and unwind the rollo screen at the rearward side;
   an operating beam connected to the forward side and having two outer ends; and
   two longitudinally extending guides configured to guide respective ones of the outer ends of the operating beam and respective ones of the lateral sides of the rollo screen, wherein said retention members cooperate with corresponding parts of the guides to retain said lateral sides in said guides, and wherein at least one of the guides is configured to guide said first one of the lateral sides; and at least one elongate light bar extending longitudinally along the guide associated with the first one of the lateral sides of the rollo screen to transmit light into said end portion of the light transmitting and emitting members;

wherein said end portion of the light transmitting and emitting members protrudes laterally beyond the respective lateral side of the rollo screen, the at least one elongate light bar is located laterally with respect to the respective protruding end portion, and the at least one elongate light bar is provided with a recess extending longitudinally and configured to at least partially receive said protruding end portion.

2. The rollo assembly according to claim 1, wherein said end portion of the light transmitting and emitting members substantially ends at the respective lateral side of the rollo screen.

3. The rollo assembly according to claim 2, wherein the elongate light bar is located laterally with respect to the respective lateral side of the rollo screen.

4. The rollo assembly according to claim 1, wherein the elongate light bar is located one of above or below said protruding end portion.

5. The rollo assembly according to claim 1, wherein an outer end of said protruding end portion is provided with a retention member.

6. The rollo assembly according to claim 1, wherein said recess is provided with chamfered walls.

7. The rollo assembly according to claim 1, wherein the elongate light bar comprises two opposite ends and wherein a light source is positioned at at least one of said opposite ends.

8. The rollo assembly according to claim 1, wherein both guides are provided with a light bar for cooperation with respective end portions of light transmitting and emitting members in a vicinity of both lateral sides of the rollo screen.

9. The rollo assembly according to claim 1, wherein the retention members comprise hook-like retention members cooperating with respective parts of the guides and provided at at least one of upper and lower surfaces of the rollo screen.

10. The rollo assembly according to claim 1, wherein the at least one light bar comprises injection moulded parts with a cross sectional area between 4 and 40 mm$^2$ per each meter of length of a said light bar.

11. The rollo assembly according to claim 1, wherein the at least one light bar has an outer surface, which at least partially is provided with a surface configuration to improve the transmission of light.

12. The rollo assembly according to claim 1, wherein the at least one light bar has a cross section which in a direction towards the end portion tapers to a reduced thickness.

13. The rollo assembly according to claim 1, wherein the light transmitting and emitting members are positioned at a side of the rollo screen facing an interior of the vehicle.

14. The rollo assembly according to claim 1, wherein the light transmitting and emitting members comprise glass fibers oriented transversally.

15. The rollo assembly according to claim 1, wherein the light transmitting and emitting members are combined into a single flexible foil.

16. The rollo assembly of claim 15 wherein the foil is adhered to a side of the rollo screen configured to face an interior of the vehicle.

17. An open roof construction for a vehicle, comprising a roof opening in a stationary roof part, the open roof construction comprising:

a movable panel which can move relative to said roof opening and a rollo assembly the rollo assembly comprising:

a rollo screen having opposite forward and rearward sides and two opposite lateral sides, wherein the rollo screen is provided with light transmitting and emitting members which have an end portion extending at least up to a first one of the lateral sides of the rollo screen;

a winding tube configured to wind and unwind the rollo screen at the rearward side;

an operating beam connected to the forward side and having two outer ends; and two longitudinally extending guides configured to guide respective ones of the outer ends of the operating beam and respective ones of the lateral sides of the rollo screen; and at least one elongate light bar extending longitudinally along one of the guides and disposed to transmit light into said end portion of the light transmitting and emitting members;

wherein said end portion of the light transmitting and emitting members protrudes laterally beyond the respective lateral side of the rollo screen, and the at least one elongate light bar is provided with a recess extending longitudinally and configured to at least partially receive said protruding end portion.

* * * * *